United States Patent

Wiand

Patent Number: 5,209,760
Date of Patent: May 11, 1993

[54] INJECTION MOLDED ABRASIVE PAD

[76] Inventor: Ronald C. Wiand, 1494 Heatherwood Dr., Troy, Mich. 48098

[21] Appl. No.: 732,503

[22] Filed: Jul. 18, 1991

Related U.S. Application Data

[63] Continuation-in-part of Ser. No. 526,055, May 21, 1990, abandoned.

[51] Int. Cl.[5] .............................................. B24D 3/00
[52] U.S. Cl. ........................................ 51/293; 51/295; 51/298
[58] Field of Search ........................ 51/293, 295, 298

[56] References Cited

U.S. PATENT DOCUMENTS

| | | | |
|---|---|---|---|
| 1,507,836 | 9/1924 | King | 51/398 |
| 2,907,146 | 10/1959 | Dyar | 51/195 |
| 3,048,482 | 8/1962 | Hurst | 51/298 |
| 4,078,340 | 3/1978 | Kleeker et al. | 51/295 |
| 4,088,729 | 5/1978 | Sherman | 51/298 |
| 4,106,915 | 8/1978 | Kagawa et al. | 51/298 |
| 4,111,666 | 9/1978 | Kalbow | 51/295 |
| 4,554,765 | 11/1985 | Grimes et al. | 51/298 |
| 4,653,236 | 3/1987 | Grimes et al. | 51/298 |
| 4,750,915 | 6/1988 | Tomita et al. | 51/298 |
| 4,945,687 | 8/1990 | Scheider et al. | 51/298 |

FOREIGN PATENT DOCUMENTS

| | | |
|---|---|---|
| 619539 | 5/1961 | Canada . |
| 345239A1 | 12/1989 | European Pat. Off. . |
| 52-74990 | 6/1977 | Japan . |
| 106166 | 5/1917 | Netherlands . |
| 1827 | 11/1862 | United Kingdom . |
| 2043501 | 10/1980 | United Kingdom . |

Primary Examiner—Mark L. Bell
Assistant Examiner—Willie J. Thompson
Attorney, Agent, or Firm—Harness, Dickey & Pierce

[57] ABSTRACT

A one-piece abrasive sheet and method of manufacture. The abrasive pad has a planar sheet portion with a plurality abrasive protrusion extending therefrom. The protrusions are intimately molded with the planar sheet portion to form a one-piece sheet. Thermoplastic and abrasive grit mixture may be used to form the sheet by injection molding.

9 Claims, 2 Drawing Sheets

INJECTION MOLDED ABRASIVE PAD

RELATED APPLICATIONS

This application is a continuation is part of U.S. application Ser. No. 526,055, filed May 21, 1990, now abandoned, entitled "Flexible One-Piece Diamond Sheet Material With Spaced Apart Abrasive Portions".

BACKGROUND OF THE INVENTION

The present invention relates to a flexible one-piece abrasive sheet. More particularly, the present invention relates to a flexible one-piece abrasive sheet which includes spaced apart abrasive portions which may be used as polishing pads and the like, and is particularly useful for polishing of marble and stone surfaces. Still more particularly the present invention relates to an abrasive pad which can be injection molded.

In the past, the use of abrasive pads which include abrasive resinoid segments attached to backing substrates, has been common when polishing stones and marbles and other materials. Because of the relatively thick and non-yielding resinoid segments generally used in this operation, it has been problematic to provide a flexible type abrasive pad using these types of segments. In the past, these segments have been attached to backing substrates, such as fabrics or the like, utilizing a large number of small segments to produce a flexible abrasive pad. Such abrasive pads are commonly used on rotary polishers for finishing of marble floor surfaces, for instance. While these structures have been useful as rotary polishing pads, the operational life of the pads has been low. This is because of disattachment of segments during use.

Therefore, it has been a goal in the art to produce a long lasting flexible "segmented-type" abrasive sheet material which will have increased durability and be less subject to loss of abrasive portions during use.

Prior to the parent application, U.S. Ser. No. 526,055, thermoplastics have not found use in abrasive pad structures. While that application discloses a great advance in the art a more economical and efficient process for manufacture of such thermoplastic pads is desirable.

SUMMARY OF THE INVENTION

In accordance with the present invention there is provided a one-piece flexible abrasive sheet which may be in the form of a pad. The one-piece abrasive sheet includes a flexible planar sheet portion having a plurality of abrasive protrusions extending therefrom. The protrusions are intimately molded with a backing sheet from a thermoplastic material. The material includes an intimate mixture of an abrasive grit material.

The abrasive pad of the present invention provides a one-piece pad which increases the longevity of the pad during normal use, such as finishing of marble floors or flat edges and radius edges of counter tops, and reduces the amount of lost abrasive portions due to the integral molding of the portions with the substrate sheet.

In an alternate embodiment of the abrasive pad of the present invention, an abrasive pad is provided which is produced by injection molding of a thermoplastic abrasive grit mixture.

Additional benefits and advantages of the present invention will become apparent from the subsequent description of the preferred embodiments and the appended claims taken in conjunction with the accompanying drawings.

DESCRIPTION OF THE PREFERRED EMBODIMENTS

Figure 1:
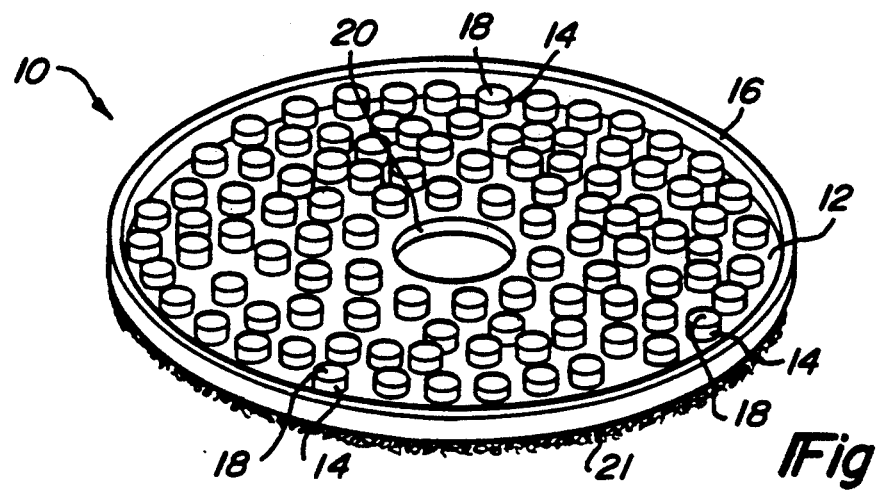
FIG. 1 is a perspective view of an abrasive pad made in accordance with the teachings of the present invention.

Referring now to the drawings, according to the present invention there is provided a flexible one-piece abrasive sheet, such as pad 10. The one-piece abrasive pad 10 includes a flexible planar sheet portion 12 which has a plurality of abrasive protrusions 14 extending therefrom. The protrusions 14 are intimately molded with the sheet portion 12. For molding of these, a thermoplastic material, thermosetting material or other moldable and curable material is used which has an intimate mixture of an abrasive grit material therein.

In a preferred embodiment of the present invention, the pad 10 is formed in a circular embodiment with a peripheral lip portion 16 extending in the same direction as the protrusions 14. The lip portion 16 advantageously allows the pad to climb over obstacles in an irregular surface without damaging the abrasive protrusions 14. The advantage of the lip portion 16 is set forth in more detail in my co-pending U.S. patent application Ser. No. 502,056 Entitled "Marble, Granite and Stone Finishing Method and Abrasive Pads Therefor", filed Mar. 30, 1990, which is incorporated herein by reference thereto. The protrusions 14 have outer abrasive end surfaces 18 which are co-planar to one another. Preferably lip 16 is also co-planar to these peripheral edges 18. The pad 10 includes a central orifice 20 which is provided for fitting on a particular rotary tool to provide clearance during use. A means for attachment to a polishing tool, such as a velcro hook and loop fastener 21 is attached to the back of the pad 10. Such velcro attachments are common in the rotary tools used today. However, other means for attachment could readily be adapted as a particular tool required.

Figure 4:
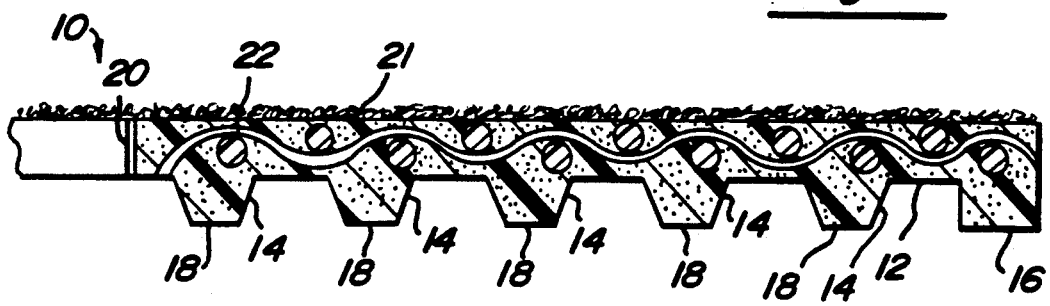
FIG. 4 is a sectional view of the abrasive pad of FIG. 1.

Referring now to FIG. 4, in a preferred embodiment a strengthening element 22 is integral with the backing portion 12. The strengthening element 22 may be any of a number of materials which have a plurality of apertures therethrough. A suitable strengthening element provides strengthening to the pad while retaining flexible characteristics of the backing portion 12 during use. In a preferred embodiment the strengthening element 22 is a woven mesh material such as a fiberglass mesh material, as shown in FIG. 4. In the embodiment shown in FIG. 4, the mesh material is embedded in the thermoplastic during the forming of the sheet portion 12.

Figure 3:
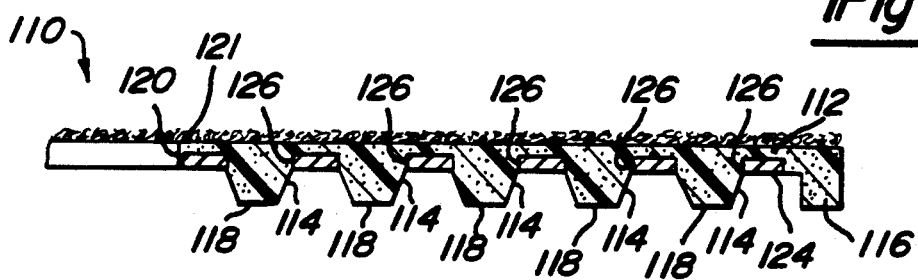
FIG. 3 is a sectional view of an alternate embodiment of an abrasive pad made in accordance with the teachings of the present invention.

Referring now to FIG. 3, there is shown an alternate embodiment of an abrasive pad, generally shown at 110. In the figures like numerals differing by 100 refer to like elements in the alternate embodiment 110. The alternate embodiment 110 is similar to the embodiment 10, however a perforated phenolic sheet material 124 is utilized as a strengthening element in place of the strengthening mesh 22. In this embodiment the thermoplastic is molded in-situ with the phenolic board such that the thermoplastic progresses through the perforations in the phenolic board material. The phenolic sheet material 124 is attached to the thermoplastic due to the compatible adhesive characteristics of the thermoplastic and the phenolic board and also due to the mechanical interlock of the protrusion 114 with the apertures 126 in the phenolic sheet material 124. A NEMA grade G-3 phenolic board, such as that utilized in circuit board applications, is a preferred material for this embodiment.

Preferably, the material used for forming the one-piece abrasive pad of the present invention is a thermosetting, thermoplastic or moldable polymer material which includes suitable abrasive particles interspersed therethrough. The material used must be sufficiently formable by melting or may have an initial liquid form, such that it may be forced to flow into and around the strengthening element. Suitable thermoplastic materials include polycarbonates, polypropylenes, nylons, polyurethanes, or other thermoplastics which can be thermomelted with heat and pressure to produce the abrasive pad 10 or 110. A preferred material is a polypropylene powdered material which may be mixed with diamond grit particles and/or silicon carbide type particles in its powdered form prior to the molding operation. Of course, other abrasive grit materials could be utilized in the present invention as will be readily appreciated by those skilled in the art.

In the past, it has generally been taught that thermoplastics are not generally useful in abrasive grit particles due to the heat and resulting decomposition and melting during use of such materials. However, in the present invention I have deviated from the prior art teachings by using thermoplastic materials which I have found to be suitable for such applications. Thermoplastics are desirable from a production standpoint in that thermoplastics adaptable to cost effective manufacturing techniques such as injection molding. In a preferred embodiment of the present invention abrasive pads are injection molded in accordance with a process to be set forth below.

Figure 2:
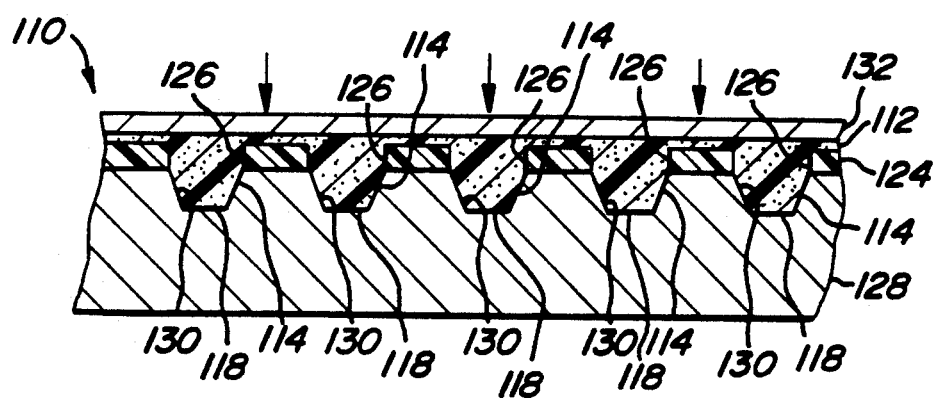
FIG. 2 is a sectional view illustrative of a process, in accordance with the teachings of the present invention, for manufacture of an abrasive pad.

Referring now to FIG. 2, in accordance with the method aspects of the present invention a lower mold platen 128 is provided which has a series of spaced indentation portions 130 corresponding to the shape of the desired protrusion in the resulting abrasive pad or sheet, such as sheet 110. An upper platen 132 is provided for placing a mixture of a thermoplastic material and an abrasive grit material under pressure, in the presence of heat, for forcing the thermoplastic and abrasive grit mixture into the indentations 130 of the mold platen 128. This forms the one-piece abrasive pad of the present invention.

Thus, in accordance with the steps of the present invention, it is first necessary to provide an intimate mixture of abrasive grit materials and a polymer material. This could be accomplished by mixing a powdered thermoplastic with an abrasive grit, by melt mixing these constituents, or by mixing the abrasive grit material in a liquid thermosetting polymer.

Thereafter, this mixture is placed in the mold platen 128 and the mixture is heated under pressure to form the resulting article 110 in the mold portion of the platen 128.

In a preferred embodiment, a strengthening element, such as the phenolic board material 124, is placed in the platen such that the orifices 126 are in the same locations as the indentations 130 of the platen 128. Thereafter, a mixture of a thermoplastic and abrasive material is placed on top of this. The platen 132 is then lowered on the above constituents in the presence of heat which thermoplastically deforms the plastic material with the abrasive grit intermixed therein and forces it through the orifices 126 and into the indentations 130 of the lower platen 128.

In an alternate embodiment, such as that shown in FIG. 4, the fiberglass or other mesh material, which is utilized as a strengthening element, may be placed on the platen 128 and thereafter the thermoplastic material is pressed through the apertures and the strengthening element to form the final abrasive pad or structure, as shown in FIG. 4.

Figure 5:
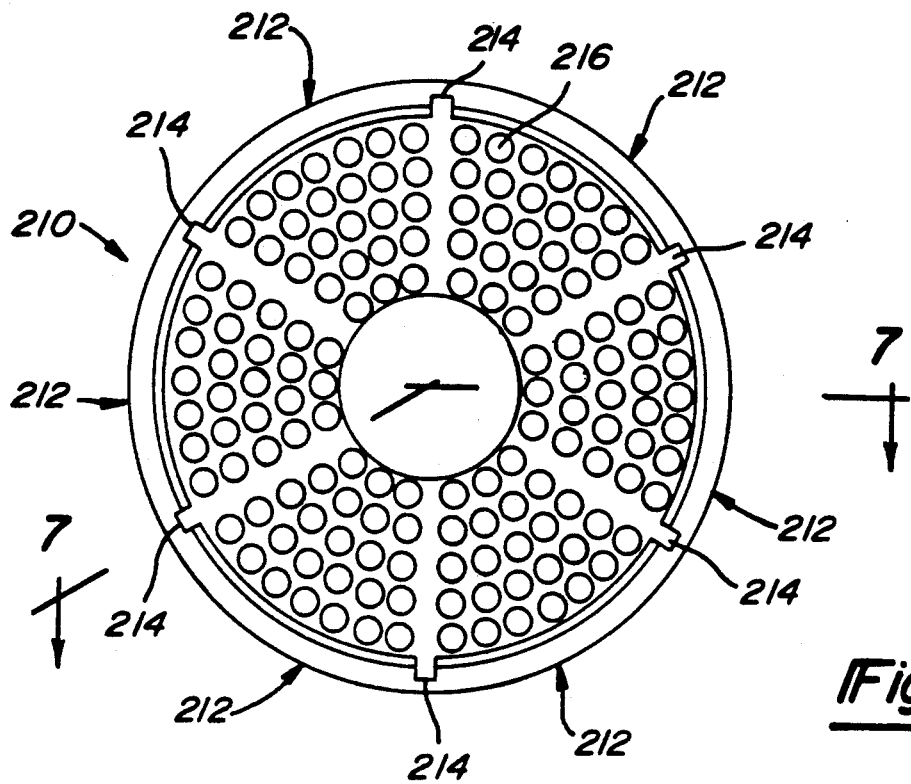
FIG. 5 is a front plan view of an alternate embodiment of an abrasive pad which is injection molded.
Figure 7:
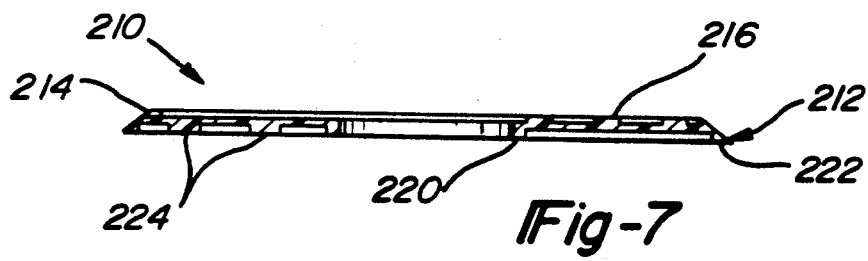
FIG. 7 is a sectional view of the abrasive pad of FIG. 5 taken along line 7—7.
Figure 6:
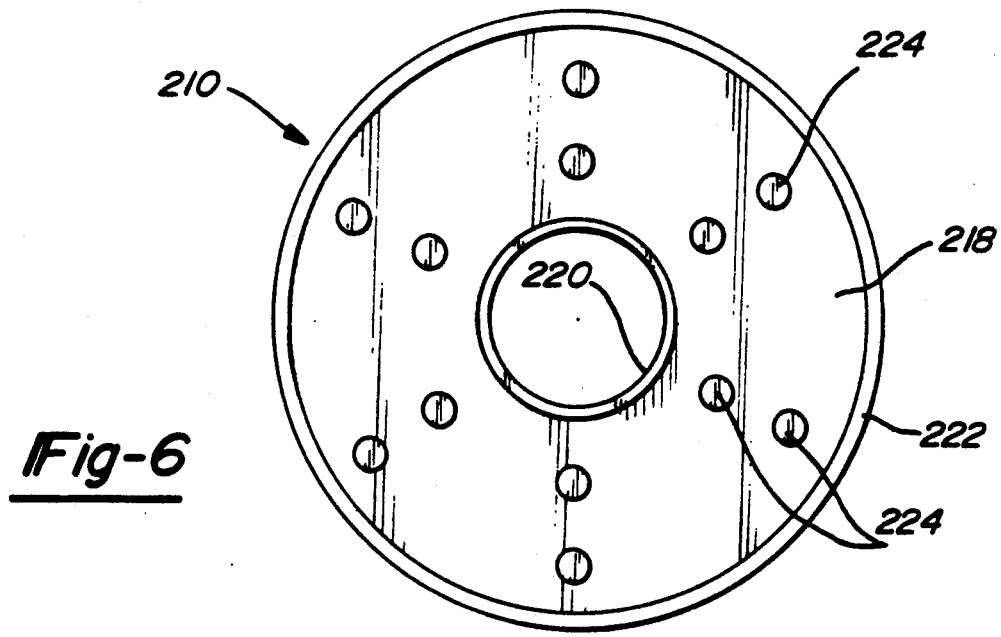
FIG. 6 is a rear plan view of the abrasive pad of FIG. 5.

Referring now to FIGS. 5-7, there is shown an alternate embodiment of a pad made in accordance with the teachings of the present invention wherein injection molding is used to produce the pad 210. The pad 210 includes a series of pie slice shaped areas, generally indicated at 212, around the circumference of the pad 210. These areas are separated by radial slotted portions, generally indicated at 214. The pie shaped segments 212 include a series of flattened stub protrusions 216 interspersed amongst these pie shaped areas 212. These protrusions are formed by the mold surfaces of an injection type mold. The rear side of the pad 210 includes a hollowed out circumferential portion 218 which has an inner lip 220 and an outer lip 222 which extend axially for supporting the pad on the tool support structure. The protrusions 224 are spaced throughout the backside and are at a co-planar level with the axial extending lips 220 and 222 for providing support throughout the pad area.

In accordance with the injection molding process of the present invention, a one-piece pad may be made with or without a strengthening element sheet inserted therein by the following steps. First a suitable injection mold structure is prepared and provided in which the pad shape is produced as set forth above. Thereafter, a mixture of a thermoplastic material, preferably a polypropylene or the like, is mixed with abrasive grit material, for instance from about 5 micron to about 150 micron sized diamond grit particulate matter, with a polypropylene material to provide a suitable abrasiveness required in such a polishing pad. Thereafter, the mixture is molded at a temperature above the melting point of the thermoplastic material and injected into the mold to produce the thermoplastic one-piece pad of the present invention. In a preferred embodiment, the thermoplastic preferably has a melting temperature above about 400° F. and would be molded at a temperature of 440° F. using 1,000 psi with 50 pounds of back pressure. It is believed that the clamped cycle time would be an effective time such as about 12 seconds.

If a strengthening element is desired such an element could be placed into the mold prior to the injection molding process. This allows for molding of the strengthening element into the pad itself.

In an alternate embodiment of the present invention, in order to save grit material the backing substrate may be first injection molded with an abrasive free polypropylene and thereafter the abrading protrusions 216 may be injection molded onto the backing substrate as a separate function. In such an embodiment, the protrusions will contain the grit matrix material but will be melt bonded to the backing substrate which contains no grit material. Since the materials are identical or at least melt bondable to one another the resulting pad is a strong one-piece structure. Thus, in accordance with this aspect, grit material is placed only in the areas required by the abrasive protrusions and is not wasted as becoming part of the backing substrate or the like.

Further understanding of the present invention may be obtained by reference to the following example which is given as further illustration of the present invention and is not to be construed to be limiting to the present invention.

EXAMPLE I 50 grams of polypropylene powder obtained from Himont Corporation of Troy, Michigan, product code number PC 072 PM, having a melt grade of 6 to 9, were mixed with 30 grams of a silicon carbide 600 grit abrasive material and 15 grams of a diamond 20/40 micron material. The powder and abrasive grit material were mixed and blended to form a congruous intermixed material.

A lower mold platen having a 3¼ inch diameter circular indentation with indentations therein for forming ⅛ inch diameter and 1/16 inch high projections and including mold portions for forming a lip ⅛ inch wide by 1/16 of an inch high was provided. A pin was provided at the center of the above mold which is ½ inch in diameter for performing the hole in the resulting abrasive pad.

13 grams of the above mixture was placed around the ½ inch pin into the bottom mold platen. On top of this a 20 mesh fiberglass material, formed 3¼ inches in diameter with a ½ inch center hole was placed. Thereafter, a suitable top platen was lowered on the above components and heated to 380° F. at 5 tons pressure for six minutes.

The abrasive grit and thermoplastic material melts and flows into the mold. The mold was released forming an abrasive pad with a lip portion, co-planar abrasive protrusions having abrasive grit material interspersed therein and a fiberglass reinforcement member embedded therein. The resulting pad was found to be suitable for floor polishing and edge polishing, railings, headstones, monuments and other marbles and the like.

EXAMPLE II

A mold was prepared wherein a 3.5 inch diameter cavity was made with a 45° outer ramp flange 0.156 inches wide and having a 0.875 inch center hole. One face of the mold is planar and flat but includes surfaces for forming an inner and outer backing lip with six pairs of concentrically spaced supporting protrusions on the bottom surface and a pad. The upper working surface includes surfaces for forming a series of 0.05 inch diameter abrasive protrusions which extend 0.05 inches to 0.06 inches in pie shaped areas which are mounted to a 0.015 inch thick web. Six spaced radially extending surfaces for forming slots in a final pad are equiangularly spaced between these pie shaped areas and are 0.180 inches wide. These are angularly spaced radially from the center hole to the outer edge.

A mixture of 50 grams of a polypropylene powder having product code number PC 072 PM, obtained from Himont Corporation of Troy, Michigan, which has a melt grade of 6 to 9 was mixed with 30 grams of a silicon carbide 600 grit abrasive material and 15 grams of a diamond 20/40 micron material.

An injection molding apparatus having three heat zones was utilized. A mold with a heated nozzle and a carbide gate and shut off plunger were used in an injection molding apparatus having three heat zones. The above mixture material is injection molded at a temperature of 440° F. using 1,000 psi and 50 pounds of back pressure. The mold base was water cooled and the clamp to clamp cycle time was about approximately 12 seconds. After the molding was completed a pad was removed and was found to be suitable for long life marble or stone polishing.

While the above description constitutes the preferred embodiments of the present invention, it is to be appreciated that the invention is susceptible to modification, variations and change of departing from the proper scope and fair meaning of the accompanying claims.

What is claimed is:

1. A one-piece abrasive pad comprising:
   a flexible planar sheet portion having a plurality of abrasive protrusions extending therefrom, said pad being produced by injection molding such that said protrusions are intimately molded with said sheet portion from a single flexible material said material including an abrasive material interspersed homogeneously therethrough such that as the pad wears down, abrasive material will be exposed.

2. The one-piece abrasive pad of claim 1 wherein said protrusions have a coplanar abrasive surfaces.

3. The one-piece abrasive pad of claim 1 further comprising a strengthening element integrally molded within said sheet portion.

4. The one-piece abrasive pad of claim 1 further comprising a phenolic board backing material molded in-situ with said pad for providing a strengthening element for said sheet portion.

5. The one-piece abrasive pad of claim 1 wherein said material is a thermoplastic material.

6. A process of manufacture of an abrasive sheet comprising the steps of:
   a) providing an injection mold structure having a series of concavities therein for forming a pad shaped with abrasive protrusions extending therefrom;
   b) formulating a mixture of thermoplastic material and an abrasive grit material for injection molding of an abrasive pad with abrasive grit homogeneously dispersed therethrough; and
   c) injection molding an abrasive pad by forcing said mixture into said concavities for forming the abrasive sheet.

7. The process of claim 6 wherein a pad substrate informulated with a first abrasive free thermoplastic and said protrusions are attached thereto by injection molding of a thermoplastic and abrasive grit mixture to the abrasive free substrate.

8. The process of claim 6 wherein said thermoplastic further comprises a polypropylene material.

9. The process of claim 7 wherein said thermoplastic further comprises a polypropylene material.

* * * * *